No. 895,287. PATENTED AUG. 4, 1908.
J. McDONALD.
SPRAG SHARPENER.
APPLICATION FILED MAR. 7, 1908.
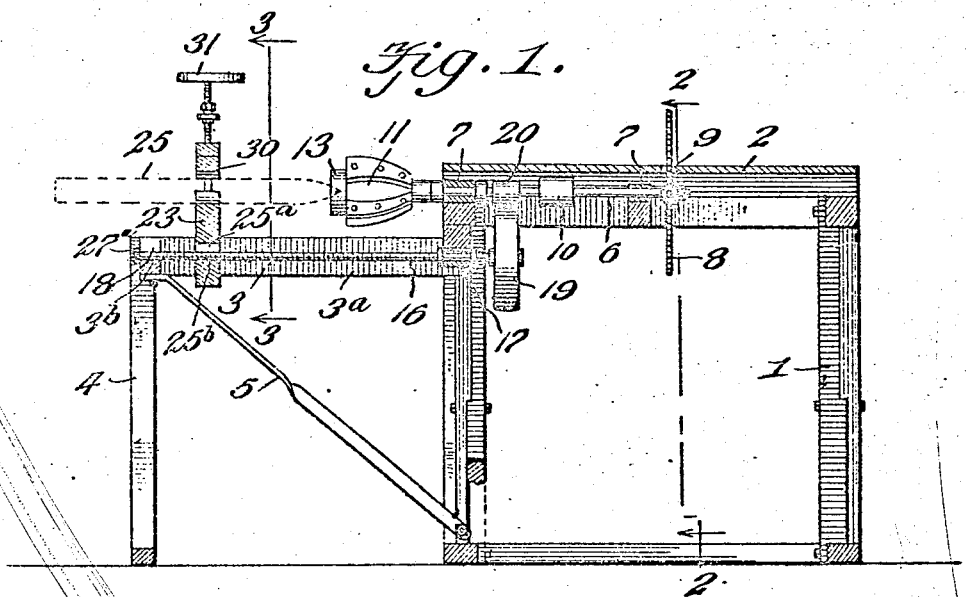
Fig. 1.
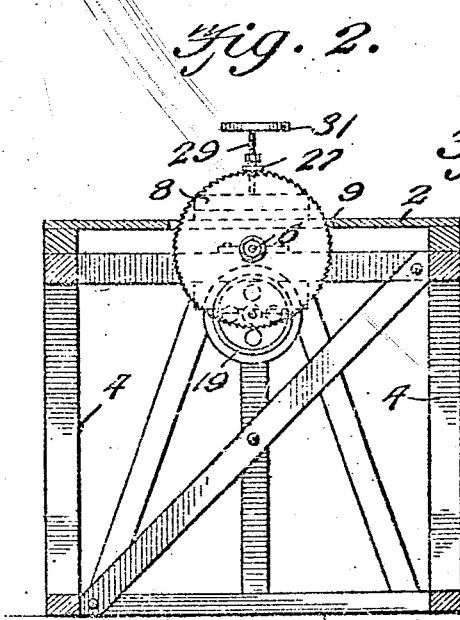
Fig. 2.
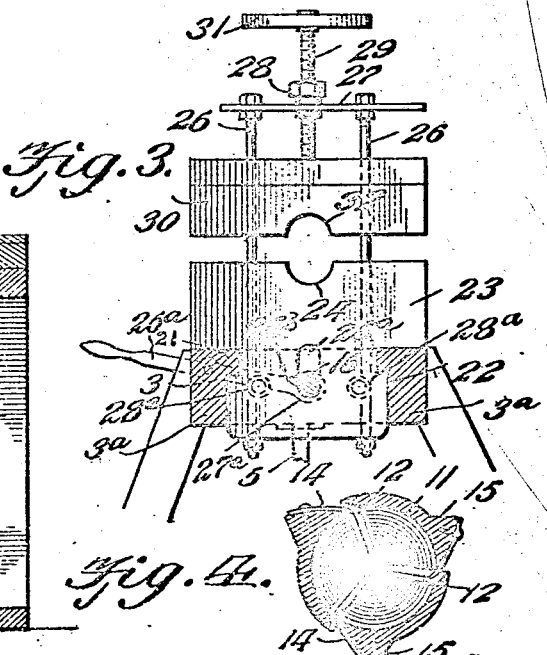
Fig. 3.
Fig. 4.
Witnesses
Frank B. Hoffman
C. C. Hines
Inventor
John McDonald
By Victor J. Evans
Attorney

UNITED STATES PATENT OFFICE.

JOHN McDONALD, OF SILVER CREEK, PENNSYLVANIA.

SPRAG-SHARPENER.

No. 895,287.   Specification of Letters Patent.   Patented Aug. 4, 1908.

Application filed March 7, 1908. Serial No. 419,753.

*To all whom it may concern:*

Be it known that I, JOHN MCDONALD, a citizen of the United States, residing at Silver Creek, in the county of Schuylkill and State of Pennsylvania, have invented new and useful Improvements in Sprag-Sharpeners, of which the following is a specification.

This invention relates to a machine for forming and sharpening sprags, the object of the invention being to provide a simple construction of machine by which logs or billets of wood may be sawed into sprags or stakes of a desired length, and the driving ends of the sprags or stakes so formed readily and expeditiously pointed or sharpened.

A further object of the invention is to provide a machine of this character in which the billet cutting saw and sprag sharpening cutter head may be mounted upon the same shaft through a novel construction and arrangement of the parts of the machine, thus enabling both to be driven from the same source of power without complication of parts; and also to provide novel means for feeding the sprag to the cutter head and retracting the feeding device.

With these and other objects in view, the invention consists of the features of construction, combination and arrangement of parts hereinafter fully described and claimed, reference being had to the accompanying drawing, in which:—

Figure 1 is a vertical transverse section through a wood-working machine embodying my invention. Fig. 2 is a longitudinal section on the line 2—2 of Fig. 1. Fig. 3 is a transverse section on line 3—3 of Fig. 1. Fig. 4 is a transverse section through the cutter head.

Referring now more particularly to the drawings, the numeral 1 designates a suitable frame, supporting a work table 2, from one side of which frame projects a horizontal extension 3 arranged below the level of the table 2 and supported at its outer end upon a stand 4, said extension 3 comprising side bars 3ª and an outer cross-bar 3ᵇ, and being connected and braced from the adjacent side of the frame 1 by a brace rod or bar 5.

A main shaft or arbor 6 is journaled in suitable bearings 7 and extends transversely of the frame, with its outer end arranged to overhang the extension 3. Upon the inner end of said shaft is mounted a circular saw 8 arranged to project above the surface of the table 2 through a slot 9. This saw is designed to be used for cutting logs or billets of wood into suitable length to form sprags or stakes, such logs or billets being rested upon the table 2 and fed up to the saw. A pulley 10 is provided upon the shaft for connection with a belt leading from a suitable source of power, by which the shaft is driven.

Arranged upon the outer end of the shaft 6 is a cutter head 11, which is in the form of a hollow cone, having its base outwardly disposed, and provided with a series of longitudinal slots 12 extending from its apex to a point near its base, the latter being formed with a tubular guide extension 13 whereby the end of the sprag or stake which is being fed up may be accurately forced into the cone.

Through the slots 12 project cutting knives 14, whose inner cutting edges extend into the cone, and which are curved to rest against longitudinal ribs or bosses 15 formed on the exterior of the cone, which ribs or bosses are provided with curved supporting faces extending tangentially to the respective slots, by which the cutting blades or knives are disposed for effective operation on the end of the sprag to trim the same rapidly and cleanly to a point, the shavings discharging through the slots, as will be readily understood.

Arranged below and in the vertical plane of the shaft 6 is a shaft or arbor 16 journaled at its inner end to rotate and tilt vertically in a bearing 17 arranged below the bearing 7 and journaled at its outer end in a slot or open bearing 18 in the outer wall or cross bar of the frame extension 3. The inner end of said shaft carries a friction wheel 19 in engagement with a friction drum 20 on the shaft 6, by which motion will be transmitted from said shaft 6 to the shaft 16.

The side bars 3ª of the frame extension 3 are provided with guide ribs 21 and spaced to form a guideway 22 for a sliding carriage 23 recessed to receive said ribs, and whose upper face is formed with a recess 24 to receive the stake or sprag 25, and thus serve the function of a clamping jaw. Through the carriage on opposite sides of the line of the recess 24 extend guide bolts or rods 26 which project upwardly above the same and are connected by a head or cross piece 27 carrying a stationary nut 28 through which passes a coöperating screw shaft 29 connected at its lower end with a clamping block or member 30 and provided at its upper end with a hand wheel 31, the lower face of said block being formed with a recess 32 coöperating with the recess 24 in the carriage to receive the sprag, whereby, through the screw shaft 29, the block 30 may be forced downward to clamp the sprag to the carriage.

The shaft 16 extends through a vertical slot 25$^a$ in the carriage 23 and is vertically movable in said slot, whose bottom wall 25$^b$, is formed with threads to engage said shaft, whereby, when the shaft is in engagement with such threads, the carriage will be fed forward or towards the cutter head. A lever 26$^a$ is fulcrumed on the cross bar 3$^b$ and provided with an eye 27$^a$ loosely encompassing the shaft, whereby the latter may be tilted vertically to move it into and out of engagement with the threaded wall 25$^b$, and coiled contractile springs 28$^a$, one on each side of the line of the shaft, are provided to retract or return the carriage to normal position when the shaft is disengaged from wall 25$^b$, said springs being terminally connected with the carriage and bar 3$^b$.

In operation, it will be understood that the billets of wood are sawed into suitable lengths to form the stakes by the circular saw 8, and the stakes then moved to a suitably convenient position to be successively applied to the carriage and pointed or sharpened at one end by the rotary cutter head 11. In the operation of sharpening, the stake is clamped in position between the carriage and block 30, as shown in dotted lines in Fig. 1, and the carriage is then fed forward by throwing the shaft 16 into engagement with the threaded wall 25$^b$, so that the inner end of the stake will enter the conical cutter head 11 and be trimmed to a tapered point by the cutting knives 14. When the end of the sprag is fully sharpened, the operator tilts the outer end of the shaft 16 upward in slot 25$^a$ and the springs return the carriage to normal position. The successive operations of separating billets of wood into suitable lengths and sharpening the driving ends of the sprags or stakes thus formed may in this manner be easily and quickly accomplished.

Having thus fully described the invention, what is claimed as new is:—

A machine of the character described comprising a frame having a table and a lateral extension forming a guideway below the plane of the table, a shaft journaled upon the frame and having one end disposed below the table and the other end disposed above said guideway, said table being provided with a slot, a circular saw upon the first-named end of the shaft projecting through said slot above the surface of the table, a pointing cutting head upon the opposite end of the shaft lying above the said guideway, a carriage arranged to traverse said guideway toward and from said pointing cutter, said carriage having a slot formed with a threaded portion, a tilting shaft extending through said slot, means for adjusting the shaft to throw it into and out of engagement with said threaded portion, and means for automatically retracting the carriage when said shaft is thrown out of engagement with said threaded portion.

In testimony whereof I affix my signature in presence of two witnesses.

JOHN McDONALD.

Witnesses:
P. J. MARTIN,
J. LINEAWEAVER.